United States Patent [19]

Greko

[11] Patent Number: 4,652,321

[45] Date of Patent: Mar. 24, 1987

[54] METHODS OF FORMING POLYMER COATED FABRIC ROOF VENT PIPE ENCLOSURES IN FLEXIBLE ROOF COVERING MEMBRANES

[75] Inventor: John C. Greko, Saginaw, Mich.

[73] Assignee: Duro-Last Roofing Inc., Saginaw, Mich.

[21] Appl. No.: 753,600

[22] Filed: Jul. 10, 1985

[51] Int. Cl.[4] .................. B32B 31/02; E04D 13/14
[52] U.S. Cl. ........................................ 156/165; 52/58;
156/196; 156/218; 156/229; 156/293; 156/256;
156/308.4; 285/42; 285/43
[58] Field of Search .................. 156/69, 71, 165, 229,
156/293, 308.4, 196, 213, 215, 218, 256; 52/58,
199, 219; 138/96 R, 96 T; 285/42, 43

[56] References Cited

U.S. PATENT DOCUMENTS

| | | | |
|---|---|---|---|
| 1,202,687 | 10/1916 | Elkerton | 285/43 |
| 1,923,220 | 8/1933 | Lightbrown | 285/42 |
| 3,040,154 | 6/1962 | Marsh | 156/218 |
| 3,446,688 | 5/1969 | Flax | 156/69 |
| 4,049,034 | 9/1977 | Veelka | 156/69 |
| 4,120,129 | 10/1978 | Nagler et al. | 52/58 |
| 4,265,058 | 5/1981 | Logsdon | 285/43 |
| 4,302,275 | 11/1981 | Burmeister | 156/218 |
| 4,374,695 | 2/1983 | Ikeda et al. | 156/293 |
| 4,555,296 | 11/1985 | Burtch et al. | 156/218 |

FOREIGN PATENT DOCUMENTS

| | | | |
|---|---|---|---|
| 2675 | 10/1974 | Japan | 156/293 |
| 221530 | 8/1941 | Switzerland | 52/58 |
| 1310003 | 3/1973 | United Kingdom | 52/58 |
| 1355517 | 6/1974 | United Kingdom | 52/219 |

OTHER PUBLICATIONS

Stone, "Seamless Roll-On Roofing" Popular Science, May 1978, p. 10.

*Primary Examiner*—Jerome Massie
*Attorney, Agent, or Firm*—Learman & McCulloch

[57] ABSTRACT

A method of forming roof vent pipe enclosures in one piece, flexible, reinforced roof-covering membranes provides a cylindrical, open ended tube of a membrane material which is heat weldable and a tube base of like heat weldable material which has an opening of a diameter to snugly accommodate the base of the vent pipe. The tube is fitted over the end of a template which is of a greater diameter than the opening and the template is projected through the opening to fold the marginal edge section of material surrounding the opening generally in an axial direction while stretching it radially, and at the same time drawing the one end of the tube down further on the template to radially stretch it so that it is disposed in lapped engagement with the marginal edge section of material. Welding heat is applied to the lapped surface to secure them in watertight relationship and, after cutting an opening in said membrane at the location of the vent pipe, the tube is fitted over the vent pipe and the base is secured in watertight relation to the membrane.

18 Claims, 8 Drawing Figures

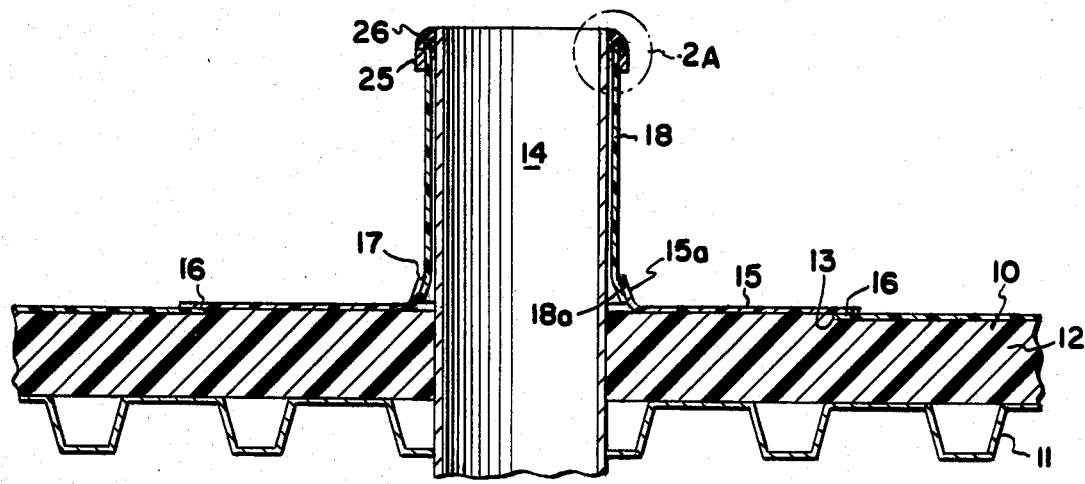
FIG. 2
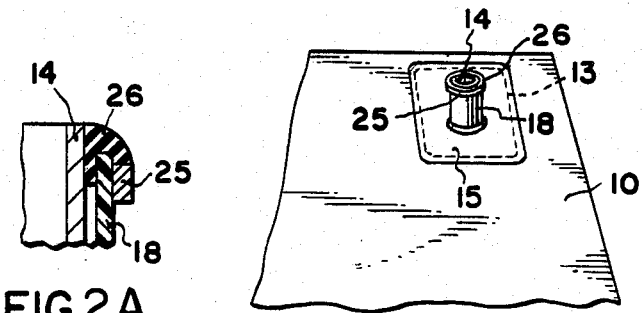
FIG. 2A
FIG. 1
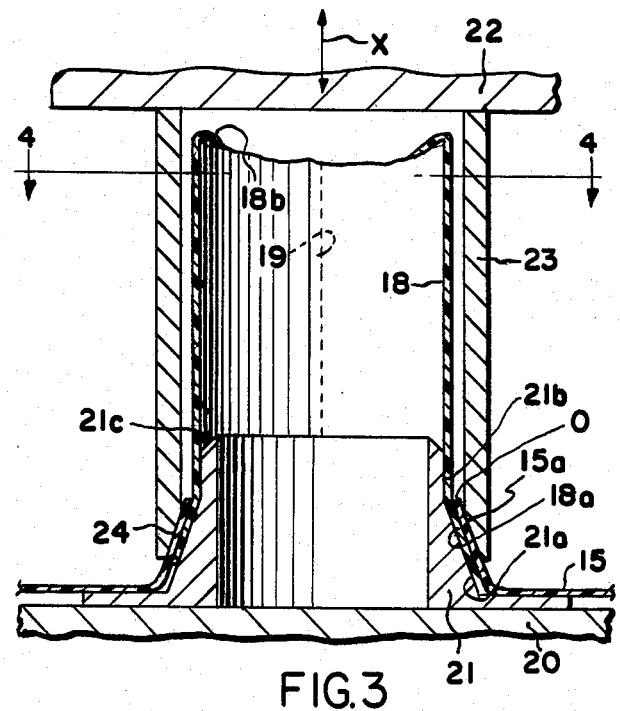
FIG. 3
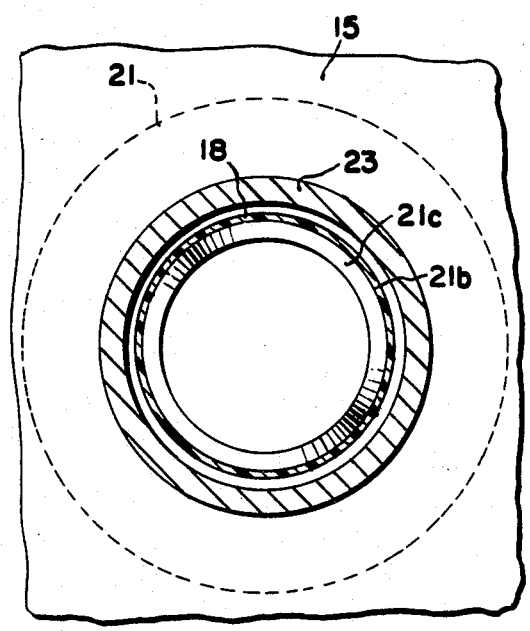
FIG. 4

METHODS OF FORMING POLYMER COATED FABRIC ROOF VENT PIPE ENCLOSURES IN FLEXIBLE ROOF COVERING MEMBRANES

FIELD OF THE INVENTION

The present invention relates to the field of roofing generally and more particularly to the formation of vent pipe enclosures in a one-piece roof covering membrane which is custom fabricated to cover the roof surface.

BACKGROUND OF THE INVENTION

Recently polymer-coated polyester base fabric has been employed to form very flexible unitary membranes which are custom fitted to various shapes, sizes and forms of roofs, particularly to what may be termed minimum pitched, roofs. Such roof coverings provide outstanding serviceability and weathering, accommodating at least light traffic when installed over existing roofs. Since the membrane material is very light in weight, weighing in the neighborhood of only 3.33 ounces per square foot, such membranes can be installed over old roofing, where structural weight limits are a major consideration.

Other features of such an all one-piece roof are the elimination of seepage, the excellent dimensional stability under humidity and temperature changes, and the added attributes that the roof will not absorb moisture, will not become stiff, inflexible or crack, and the further factor that the membrane resists the degrading effects of ultra violet rays, abrasions, and microorganisms, and has excellent resistance to many common chemicals.

One of the problems concerned with the installation of such one-piece, watertight membranes is what to do about existing metal vent pipes or stacks which must project through the roof covering. Formerly, when a vent pipe was to protrude, a separate tube was first formed of the membrane material, and a circular hole was cut in the membrane which was slightly smaller than the base of the vent pipe, thus creating a snug fit between the vent pipe and the material. The tube, which was slightly larger in diameter than the vent pipe, was then brought down over the vent pipe and pressed to the base against the flange of the roof pipe, after which the base of the tube was simply welded directly to the membrane material. Such vent tube enclosures often did not have a professional appearance, and were so relatively weak along the heat-welded seam that they could be torn apart by hand.

SUMMARY OF THE INVENTION

One of the prime objects of the present invention is to provide a new method of forming unique vent enclosures which are of a strong and durable nature, and cannot be torn away any more easily than the membrane itself.

The present invention relates to an improved method of forming roof vent pipe enclosures wherein the lower end of a stack enclosure sleeve is fitted over a welding template which is of a lesser diameter than the sleeve. A membrane base with an opening of a lesser diameter than the template is then fitted axially down over the sleeve and template in a manner to fold the marginal edge section of the material surrounding the opening generally in an axial direction into lapped engagement with the lower end of the sleeve. Welding heat is applied to the lapped marginal edge section and lower end of the tube to secure them in watertight relationship, and the enclosure is installed over a vent stack and welded in place as a part of the roof membrane.

Another object of the invention is to provide an economical and practical method of forming vent stack enclosures, which will readily function as a part of a one-piece reinforced roof covering membrane and which can be relatively simply installed in place in the field by relatively unskilled workmen.

Other objects and advantages of the invention will become apparent by reference to the following specification and to the drawings.

IN THE DRAWINGS

FIG. 1 is a fragmentary, perspective plan view of a portion of a roof showing a vent enclosure, formed according to the process which will be described, mounted in position to enclose and seal a typical roof vent or stack;

FIG. 2 is a greatly enlarged, sectional elevational view of a typical installation;

FIG. 2A is a fragmentary, sectional elevational view of the portion of the construction disposed in the circle designated 2A in FIG. 2;

FIG. 3 is a sectional, elevational view illustrating the apparatus for heat welding the enclosure parts to form a unitary watertight structure;

FIG. 4 is a top plan view, taken on the line 4—4 of FIG. 3; and

Figure 5:
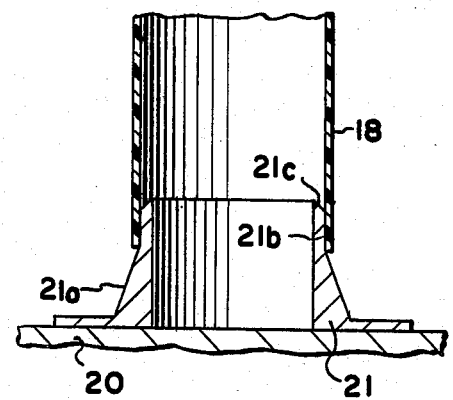
Figure 6:
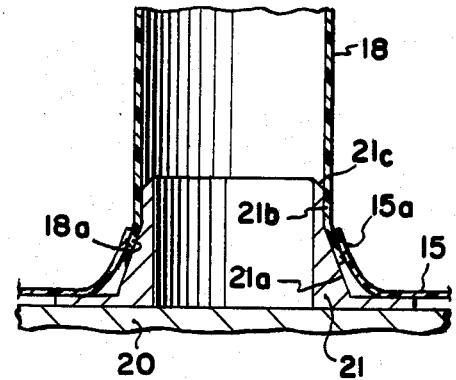
Figure 7:
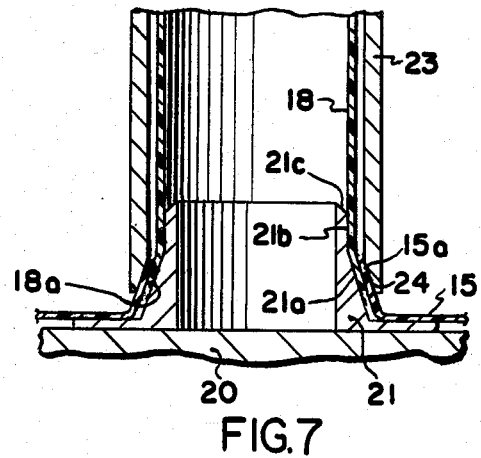

FIGS. 5-7 are reduced size, fragmentary, sectional elevational views illustrating various steps in the method Referring now more particularly to the accompanying drawings, and in the first instance to FIGS. 1 and 2, the one-piece, single ply, polymer coated, polyester fabric membrane, about 35 mils in thickness, is disclosed at 10 in FIGS. 1 and 2, as covering an existing metal roof 11, there being insulation 12 provided between the membrane 10 and interlocked metal roof panels 11 which are supported by the usual purlins (not shown) forming the underlying roof structure. The closely woven, i.e., in the nature of canvas, polyester fibre, reinforcing fabric, or scrim forming the core of the membrane 10, i.e., glyptal or alkyd resins such as those formed by the linear esterification of phthalic acid and ethylene glycol, is coated with a co-polymer alloy thermoplastic such as ethylene vinyl acetate, or another suitable polyolefin, for example. The membrane 10 is prefabricated in the factory to fit a particular roof and may be secured with mechanical fasteners, ballasting or with adhesive. A round or square opening 13 is cut in the membrane 10 at the location of the particular vent pipe or stack 14, usually at the time of installation of the membrane 10, and the vent stack enclosure which has been fabricated to fit it is applied in the field at this time.

The vent enclosure constructed includes a base piece 15, of the same material as the membrane, the dimensions of the base 15 being such that its outer perimetral edges will lap the marginal edges of the opening cut in the membrane 10, as disclosed in FIG. 2, to provide a lapped joint, generally designated 16. Cut in the central portion of the base 15, is a circular opening 17 of a diameter somewhat (i.e., ⅛ inch) less than the diameter of the stack 14. It is to be understood that the membrane material is somewhat stretchable, i.e., about twenty seven percent, and has the flexibility of a thin fabric. The enclosure also includes a sleeve or tube 18.

To form the enclosure, a rectangular piece of material, of the same material as membrane 10 and base 15, is first shaped to a cylindrical form of the desired diameter and its edges are lapped and axially heat-welded together, as along seam 19. Apparatus for accomplishing the process includes a table or platform 20, mounting an axially projecting template 21, and it will be seen that the template 21 is a rigid tubular member having a beveled or tapered annular surface 21a, an upper cylindrical surface 21b, and a beveled pilot surface 21c. The surface 21a increases in diameter from an upper end which is substantially the diameter of the interior of the cylindrical tube 18 which is formed (i.e., ½ inch in diameter greater than the diameter of stack 14), to a lower end which is somewhat greater in diameter than the internal diameter of tube 18. Provided above the table 20 is a press platen 22, which is movable vertically (as with air or hydraulic cylinders) in the direction x, toward and away from the fixed rigid platform 20. Provided between the platen 22 and table 20 is a rigid sleeve or tube 23, having a lower beveled edge 24 which parallels the surface 21a.

In the fabrication of the enclosure, prior to the time the platen 22 is moved downwardly and the sleeve 23 is fitted into position, the tube 18 is moved down over the free and accessible end of the template 21 as shown in FIG. 5, and its end edge is pulled downwardly over the surface 21b, as in FIG. 5.

The base 15 is then pulled downwardly over tube 18 in the manner disclosed in FIG. 6 to dispose the marginal portion 15a of the base 15 which surrounds opening O generally axially in lapped engagement with the lower edge 18a of tube 81, as shown in FIG. 3. The friction between tube 18 and edge 15a causes the tube end 18a to be stretched and drawn down over the surface 21a, and surface 15a is also stretched in this step. Thereafter, sleeve 23 can be moved down over the tube 18 to the position shown in FIG. 3, and after tucking in the top of tube 18 as at 18b, press platen 22 is lowered to exert a clamping pressure which squeezes the portions 18a and 21a. In this step, the edges 15a and 18a are further stretched under the influence of the heat and pressure applied, and drawn further down on surface 21a.

Finally, welding heat is applied to the tube 23 and the template 21 to effect a heat weld of the lapped portions 18a and 21a around their peripheries. Preferably, the weld is a dielectric weld created by r.f.-induced, high frequency microwaves which heat the tube 23 and template 21 to welding temperature, i.e., in the range 275 to 325 degrees F., but electrical resistance heating units in contact with sleeve 23 and template 21 could also be used. The angularity of surfaces 21a and 24 is chosen carefully, to be in the neighborhood of 20 degrees, because, while the membrane material can be stretched slightly, it cannot be over-stretched if a trouble-free, first class, watertight enclosure is to be provided. Because the desired stretch is secured, tube 18 is interior relative to edge section 15a.

At the time of installation, the base 15 is heat welded to membrane 10 around the lapped edges 16, with a suitable hot air gun of conventional design, after first being fitted in position over the metal stack 14. A seal is provided at the upper end of the stack in the form of a metal clamp band 25, and a suitable sealing mastic 26, i.e., urethane, is provided to extend between the stack 14 and tube 18. The strap 25 provides the necessary rigidity to hold the flexible tube 18 in the installed position.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. A method of forming roof vent pipe enclosures in one-piece, flexible, roof-covering membranes comprising the steps of:
   a. providing a generally cylindrical, open ended tube of a reinforced membrane material which is heat weldable;
   b. providing a base of like heat weldable material and cutting an opening therein of a diameter to snugly accommodate the base of the pipe;
   c. projecting an axially extending template having an axially tapering portion, of a greater diameter than said opening, through said opening to fold the marginal edge section of material surrounding said opening generally in an axially tapering direction while stretching it radially, and arranging the one end of the tube so that it is in lapped engagement with said marginal edge section of material;
   d. applying welding heat to said lapped marginal edge section and said one end of the tube to secure them in watertight relationship;
   e. cutting an opening in said membrane at the location of a vent pipe; and
   f. fitting the tube over said pipe and securing the base in watertight relation to the membrane, around the opening provided therein.

2. The method of claim 1 wherein said one end section of the tube is received radially within the said marginal edge section.

3. The method of claim 1 wherein the said one end of the tube is mounted on said template in surrounding engagement therewith before said template is projected.

4. The method of claim 3 wherein said template has a beveled surface of increasing diameter and a portion of the said tube end is radially stretched around said surface in tight engagement therewith.

5. The method of claim 4 wherein said marginal edge section is brought down on said portion of the tube end to further radially stretch said tube end by frictionally drawing it further down on said beveled surface and to radially stretch said marginal edge section at the same time.

6. The method of claim 5 wherein a sleeve having a beveled surface on the interior thereof, of complementing taper to said first identified beveled surface, is brought down on said lapped portions of the tube and marginal edge section; axial clamping pressure is brought to bear, and heat is applied to further radially stretch said tube end and marginal edge section, and said beveled surfaces of the template and sleeve are heated to achieve an annular, water sealed, heat weld of the base and tube around the circumference of the tube.

7. A method of forming roof vent pipe enclosures for uniting with flexible, roof-covering membranes comprising the steps of:
   a. providing a generally cylindrical, open ended tube of a material which is heat weldable;
   b. providing a base piece of heat weldable material and providing an opening therein of a diameter to accommodate the base of the pipe;

c. projecting an axially extending template, having an axially tapering portion, through said opening to fold the marginal edge section of material surrounding said opening generally in an axially tapered direction which conforms to said tapered portion, and arranging the one end of the tube so that it is in lapped engagement with said marginal edge section of material; and d. applying welding heat to said lapped marginal edge section and said one end of the tube to secure them in watertight relationship.

8. The method of claim 7 wherein the said one end of the tube is mounted on said template in surrounding engagement therewith before said template is projected.

9. The method of claim 8 wherein said template has a beveled surface of increasing diameter and a portion of the said tube end is radially stretched around said surface.

10. The method of claim 9 wherein said marginal edge section is brought down on said end portion of the tube to further radially stretch said tube end by frictionally drawing it further down on said beveled surface and to radially stretch said marginal edge section around said tube end.

11. The method of claim 10 wherein a sleeve having a beveled surface on the interior thereof, of complementing taper to said first identified beveled surface, is brought down on said lapped portions of the tube and marginal edge section; axial clamping pressure is brought to bear, and heat is applied to further radially stretch said tube end and marginal edge section, and said beveled surfaces of the template and sleeve are heated while pressure is applied to clamp the lapped portions to achieve an annular, water sealed, heat weld of the base and tube around the circumference of the tube.

12. The method of claim 7 wherein the open-ended tube is formed of a flexible, synthetic, plastic membrane material.

13. The method of claim 7 wherein said tube is provided by forming a rectangular piece of material to cylindrical shape with its side edges lapped, and axially heat welding the edges along the lap.

14. A roof vent pipe enclosure for uniting with flexible, roof covering synthetic plastic membranes comprising:

a. a generally cylindrical, open ended tube of a flexible fabric material which has a thermoplastic surface and is heat weldable, the one end of said tube being radially deformed to provide an axially tapering surface of increasing diameter;

b. a flexible base piece of like thermoplastic heat weldable material with an opening therein of a diameter to accommodate the base of the vent pipe, the marginal edge section of material surrounding said base piece opening being deformed generally in an axially tapered direction to form an axially tapered surface, and arranged so that it is in lapped engagement with said tapering surface of the tube; and c. an annular weld created by melting the material of the tube and base pieces in lapped engagement under pressure, clamping them together, to secure them in watertight relationship.

15. The enclosure of claim 14 wherein said one end section of the tube is received radially within the said marginal edge section.

16. The enclosure of claim 15 wherein said marginal edge section is radially stretched by bringing it down on a beveled surface of increasing diameter over which said tube end is radially stretched to further radially stretch said tube end by frictionally drawing it further down on said beveled surface and to radially stretch said marginal edge section at the same time.

17. The enclosure of claim 14 wherein the deformation of the tube end and marginal edge surface occurs with axially graduated radial stretching of the material of both, and the material remains stretched after the weld is created to unite them.

18. The method of claim 14 wherein said tube comprises an originally rectangular sheet of material held in cylindrical shape by heat welded, axially lapped edges.

* * * * *

UNITED STATES PATENT AND TRADEMARK OFFICE
CERTIFICATE OF CORRECTION

PATENT NO.   : 4,652,321
DATED        : March 24, 1987
INVENTOR(S)  : John C. Greko It is certified that error appears in the above-indentified patent and that said Letters Patent is hereby corrected as shown below:

In column 6, line 39, change "method" to -- enclosure --.

Signed and Sealed this

Tenth Day of November 1998

Attest:

BRUCE LEHMAN

Attesting Officer

Commissioner of Patents and Trademarks